J. A. Toll,
Sawing Stone.
N° 15,024.   Patented June 3, 1856.
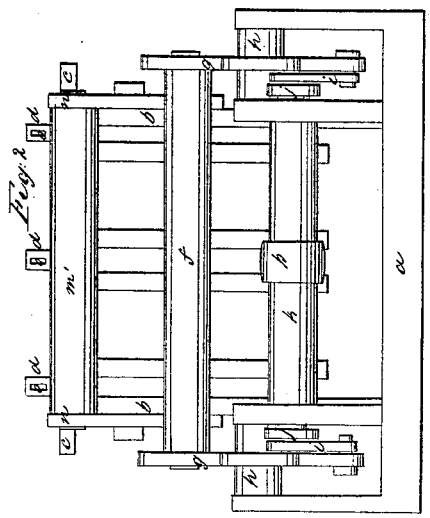
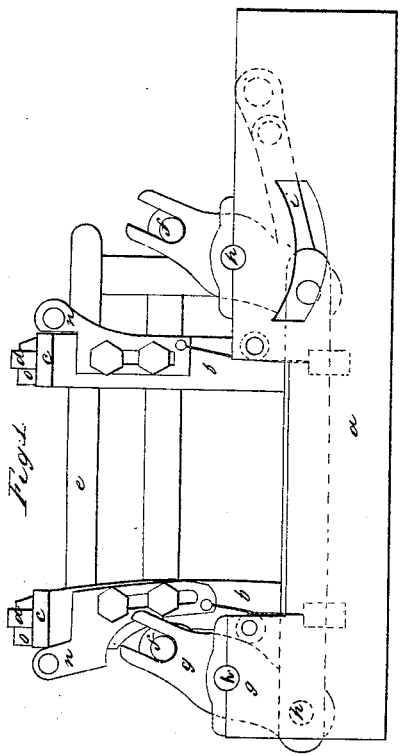
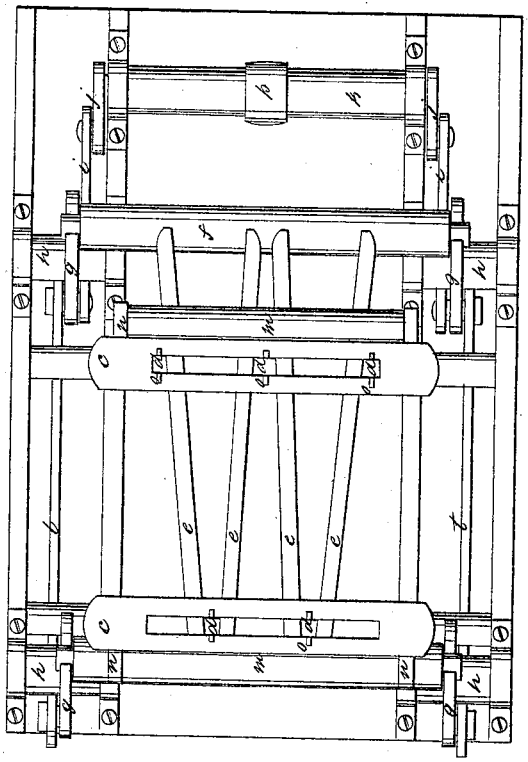

UNITED STATES PATENT OFFICE.

JOHN A. TOLL, OF SUGAR RIDGE, OHIO.

MARBLE-SAWING MACHINE.

Specification of Letters Patent No. 15,024, dated June 3, 1856.

*To all whom it may concern:*

Be it known that I, JOHN A. TOLL, of Sugar Ridge, Highland county, and State of Ohio, have invented new and useful Improvements in Marble-Sawing Machinery, of which the following is a full, clear, and exact description, reference being had to the annexed drawings, making part of this specification.

The object of my invention is to facilitate the sawing of two or more blocks of marble at the same time with either parallel or tapering sides.

In the accompanying drawing Figure 1 is a side elevation. Fig. 2 is an end view. Fig. 3 is a plan.

($a$) is the frame on which are standards ($b$) supporting on their tops cross heads or bars ($c$). Through each of these bars is a slot for the purpose of adjusting the fenders or guides ($d$).

($e$) are horizontal saw frames running between the guides and having a reciprocating motion and actuated by rollers ($f$) these rollers are placed at each end opposite the center of the saw frames or gates ($e$). The ends of these rollers rest in slotted bearings in rockers ($g$) and are easily detached, thereby permitting the removal of one or more saws. The rockers ($g$) are fastened on shafts ($h$) and are operated by pitman ($i$) operated by a crank ($j$) on shaft ($k$). The rocker shafts ($h$) have a journal at each end moving in fixed bearings; motion is communicated from one rocker to the other by means of a connecting rod ($l$).

($m\ m'$) are pressure rollers resting on the tops of the saw gates and revolve as the saws move to and fro; these rollers have journal bearings at each end working in boxes ($n$); these boxes being made adjustable, allow the rollers to bear on the saw gates with equal pressure from the beginning of the process of sawing the marble until it has finished the cut. Attached to these boxes are weights for the purpose of increasing the speed of the feed.

Through the tops of the guides ($d$) are slots through which are wedges ($o$) for the purpose of fastening the guides. By loosening these wedges the saws can be set to any desired angle.

The block of marble to be sawed is placed on a carriage and run underneath the saws on ways and there fastened until one cut is completed.

Motion is given to the driving shaft ($k$) by the belt running on pulley ($p$) and a reciprocating motion is thus communicated to the saw frames by means of pitmen ($i$) and cranks ($j$). The block of marble is cut from the top downward.

I claim as new and of my invention—

The herein described combination of saw gates, adjustable fenders and pair of actuating rollers ($f\ f$) having simultaneous vibration; the rollers ($f\ f$) being secured in bearings in the top of rockers ($g\ g$) so as to permit of being easily removed when it is desired to take out or replace a gate, the whole being constructed, arranged and operated substantially in the manner and for the purposes set forth.

In testimony whereof, I hereunto set my hand before two subscribing witnesses.

JOHN A. TOLL.

Witnesses:
JOHN G. DOUGLASS,
J. H. GRIDLY.